United States Patent
Tsai

(10) Patent No.: US 7,458,797 B2
(45) Date of Patent: *Dec. 2, 2008

(54) MOLD ASSEMBLY

(75) Inventor: Ming-Chiang Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 176 days.

This patent is subject to a terminal disclaimer.

(21) Appl. No.: 11/309,304

(22) Filed: Jul. 24, 2006

(65) Prior Publication Data

US 2007/0122514 A1 May 31, 2007

(30) Foreign Application Priority Data

Nov. 25, 2005 (TW) .................................. 94141542

(51) Int. Cl.
*B29C 33/00* (2006.01)

(52) U.S. Cl. .................... 425/192 R; 425/168; 425/577; 425/808; 425/408

(58) Field of Classification Search ............. 425/192 R, 425/577, 468, 808

See application file for complete search history.

(56) References Cited

U.S. PATENT DOCUMENTS

| 4,861,254 | A  | * | 8/1989  | Takeuchi et al. | 425/190 |
| 4,911,632 | A  | * | 3/1990  | Mansfield | 425/183 |
| 6,328,552 | B1 | * | 12/2001 | Hendrickson et al. | 425/188 |
| 7,008,212 | B2 | * | 3/2006  | Yang | 425/195 |
| 2006/0286196 | A1 | * | 12/2006 | Chien | 425/468 |

* cited by examiner

*Primary Examiner*—Yogendra Gupta
*Assistant Examiner*—Maria Veronica D Ewald
(74) *Attorney, Agent, or Firm*—Steven M. Reiss

(57) ABSTRACT

A mold assembly (200) is described that includes an upper mold (4), a lower mold (5) and a plurality of adjusting members (7). The upper mold includes an upper mold core (42). The lower mold includes a lower mold carrier (51) and a lower mold core (52). The lower mold carrier includes a plurality of sidewalls (511), which cooperatively define an opening (512) and have a plurality of screw holes (515) defined therethrough in communication with the receiving cavity. The lower mold core is received in the receiving cavity with a clearance formed therebetween. The adjusting member engages in the screw holes for aligning the lower mold core with the lower mold carrier.

17 Claims, 5 Drawing Sheets

MOLD ASSEMBLY

DESCRIPTION

1. Field of the Invention

The present invention relates to mold assemblies and, particularly, to a mold assembly, including an upper mold core and a lower mold core, functioned to precisely align an upper mold core with a lower mold core.

2. Description of Related Art

With the development of scientific technologies, portable electronic devices for imaging, such as digital cameras and mobile phones with camera lens modules have all entered widespread use.

Camera lens module for portable electronic devices includes a variety of lenses, which are generally classified into aspherical plastic lenses and aspherical glass lenses. Usually, a lens mold assembly is used to manufacture the two kinds of lens. The lens mold assembly includes an upper mold and a lower mold, which cooperatively form a mold core therebetween. The mold core is used to mold the lens. A shape of the lens, as well as interior or exterior surface of the lens, depends on a shape and an interior surface of the mold core. Because high lens concentricity is absolutely necessary, high positioning precision between the upper mold and the lower mold is a strict requirement.

Typically, a locating pin is adopted to enhance the positioning precision between the upper mold core and the lower mold core. FIG. 1 shows a typical mold assembly 100 including an upper mold 1 and a lower mold 2. The upper mold 1 includes an upper mold carrier 11 and an upper mold core 12. The lower mold 2 includes a lower mold carrier 21 and a lower mold core 22. Each of the upper mold carrier 11 and the lower mold carrier 21 has an opening defined therein, which receive the upper mold core 12 and the lower mold core 22, respectively. The lower mold carrier 21 has four guiding posts 211 symmetrically disposed thereon along the periphery of the lower mold core 22, and has two locating pins 213 symmetrically disposed thereon adjacent to each of the two opposite sides of the lower mold core 22. The upper mold carrier 11 has four guiding holes 111 and two locating pinholes 113 respectively defined thereof corresponding to the guiding posts 211 and the locating pins 213. In addition, the lower mold core 22 includes four mold cavities 222 defined between the two locating pins 213, and the upper mold core 12 includes four corresponding mold cavities 122. During the manufacturing process of the lens, the upper mold 1 and the lower mold 2 are joined together with each of the guiding posts 211 engaging in a corresponding guiding hole 111. With each of the locating pins 213 engaging in their corresponding locating pinholes 113, the upper mold core 12 and the lower mold core 22 are held together, thereby enabling lens cavities which may produce lens.

Though the typical mold assembly 100 may manufacture lenses with a predetermined shape, the high lens concentricity cannot be attained. That is because the locating pins 213 usually fail to locate the upper mold core 12 with the lower mold core 22 with a desired precision. In addition, the interference of the locating pins 213 with the locating pinholes 113 may easily result in the wear therebetween. The low positioning precision results in a high rate of defective lenses being produced. The typical way to solve such problems is to modify the mold assembly 100. However, this costs too much time and too much money.

What is needed, therefore, is a mold assembly which overcomes the above-mentioned shortcomings.

SUMMARY OF THE INVENTION

In one embodiment thereof, a mold assembly is provide for manufacturing a variety of lenses. The mold assembly includes an upper mold, a lower mold and a plurality of adjusting members. The upper mold includes an upper mold core. The lower mold includes a lower mold carrier and a lower mold core. The lower mold carrier includes a plurality of sidewalls, which cooperatively define a receiving cavity and have a plurality of screw holes defined therethrough in communication with the receiving cavity. The lower mold core is received in the receiving cavity with a clearance formed therebetween. The adjusting member engages in the screw holes for aligning the lower mold core with the lower mold carrier.

Other advantages and novel features will become more apparent from the following detailed description when taken in conjunction with the accompanying drawings.

BRIEF DESCRIPTION OF THE DRAWINGS

Many aspects of the mold assembly can be better understood with reference to the following drawings. Drawings are not necessarily drawn to scale, the emphasis instead being placed upon clearly illustrating the principles of the present mold assembly. Moreover, in the drawings, like reference numerals designate corresponding parts throughout the several views, in which.

DETAILED DESCRIPTION OF THE INVENTION

The mold assembly is suitable for manufacturing various types of molded pieces, and a preferred embodiment of the present invention takes plastic optical lens here as an exemplary application for the purpose of describing details.

Figure 1:
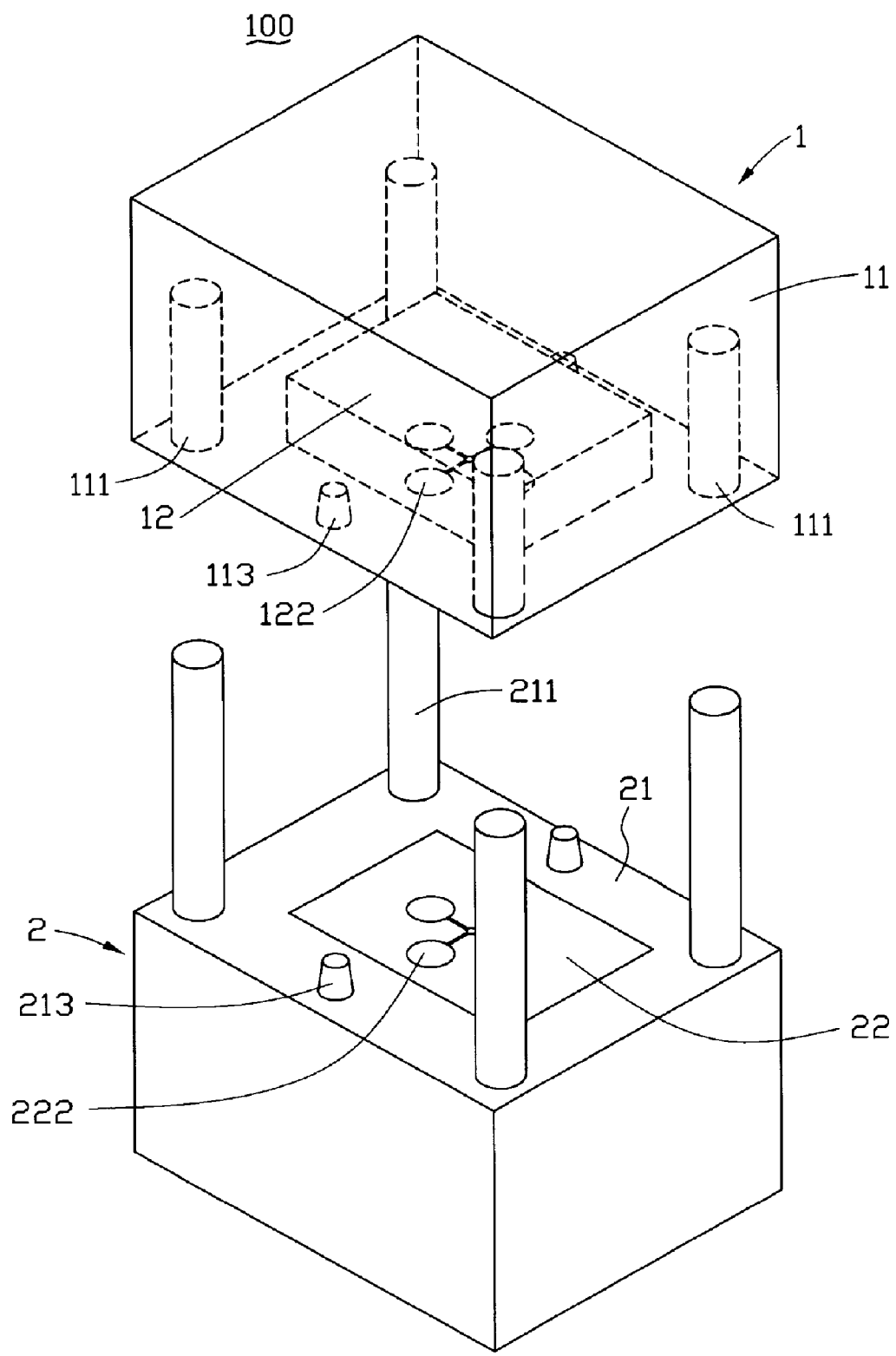
FIG. 1 is an isometric view of a typically mold assembly.
Figure 2:
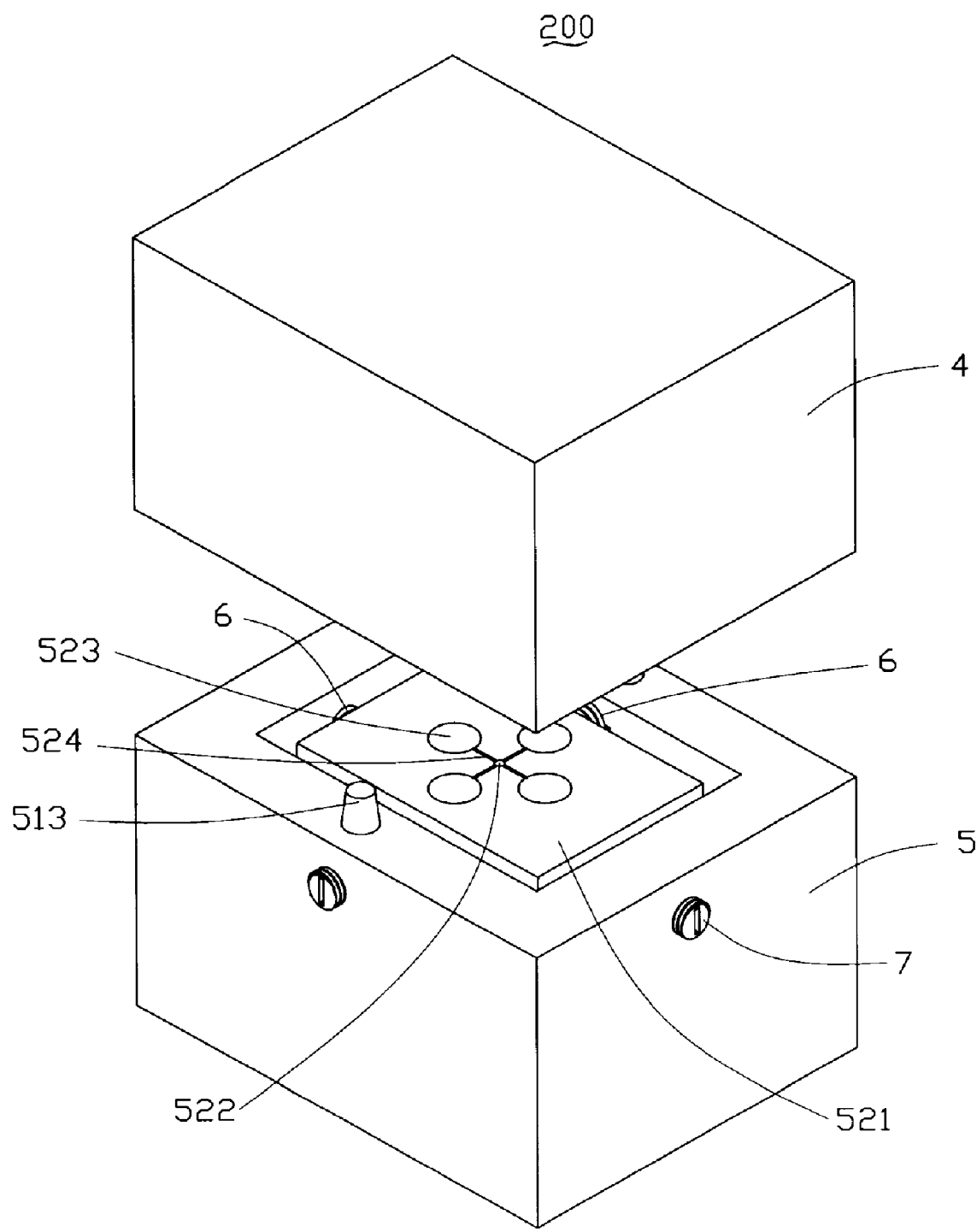
FIG. 2 is an isometric view of a mold assembly including an upper mold and a lower mold in accordance with a preferred embodiment.

Referring now to the drawings in detail, FIG. 2 shows various parts of the mold assembly 200. The mold assembly 200 includes an upper mold 4, a lower mold 5, two elastic members 6 and two adjusting members 7. The elastic members 6 and the adjusting members 7 are disposed within the lower mold 5.

Figure 3:
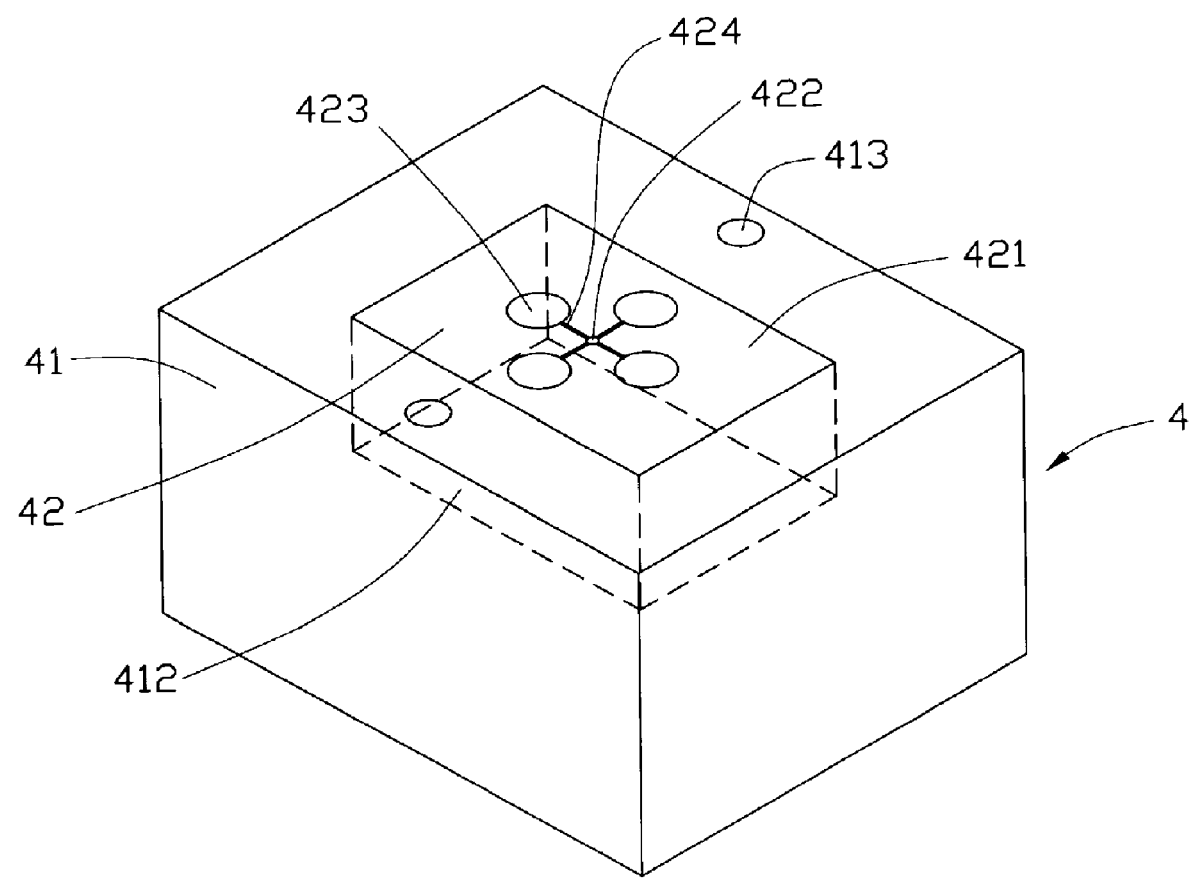
FIG. 3 is an assembled view of the upper mold shown in FIG. 2.

Referring also to FIG. 3, the upper mold 4 is generally cube-like, and includes an upper mold carrier 41 and an upper mold core 42. The upper mold carrier 41 has an opening 412 defined therein by four sidewalls. The upper mold carrier 41 has two pinholes 413 symmetrically defined therein adjacent to two opposite sides of the upper mold core 42. The upper mold core 42 includes an outer end 421. The outer end 421 has a pouring gate 422 defined therethrough, and has four mold cavities 423 defined therein along the periphery of the pouring gate 422. The pouring gate 422 and the four mold cavities 423 further have four channels 424 formed therebetween, and each of the channels 424 interconnects each of the four mold cavities 423 with the pouring gate 422, respectively.

Figure 4:
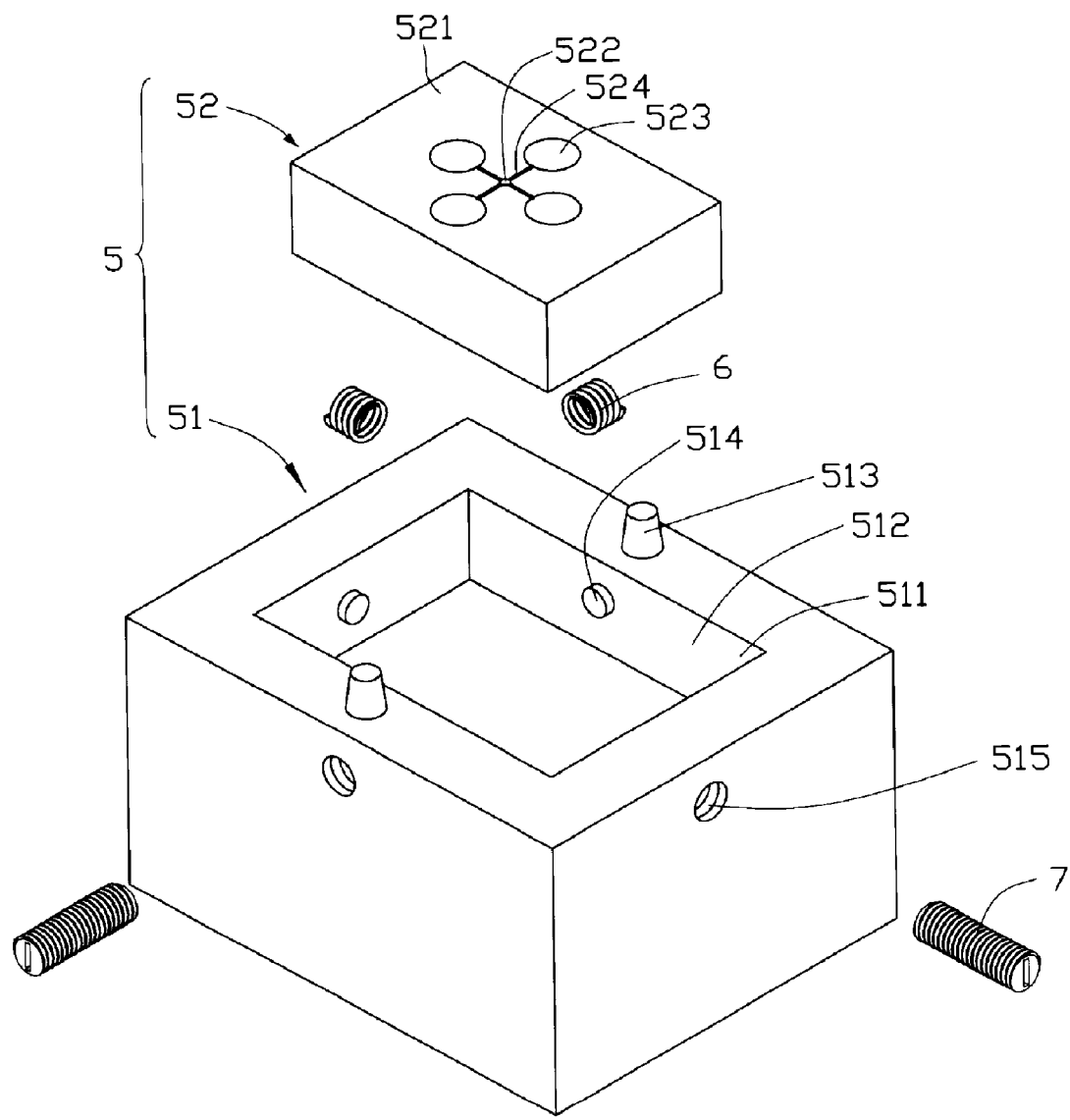
FIG. 4 is an exploded view of the lower mold shown in FIG. 2.
Figure 5:
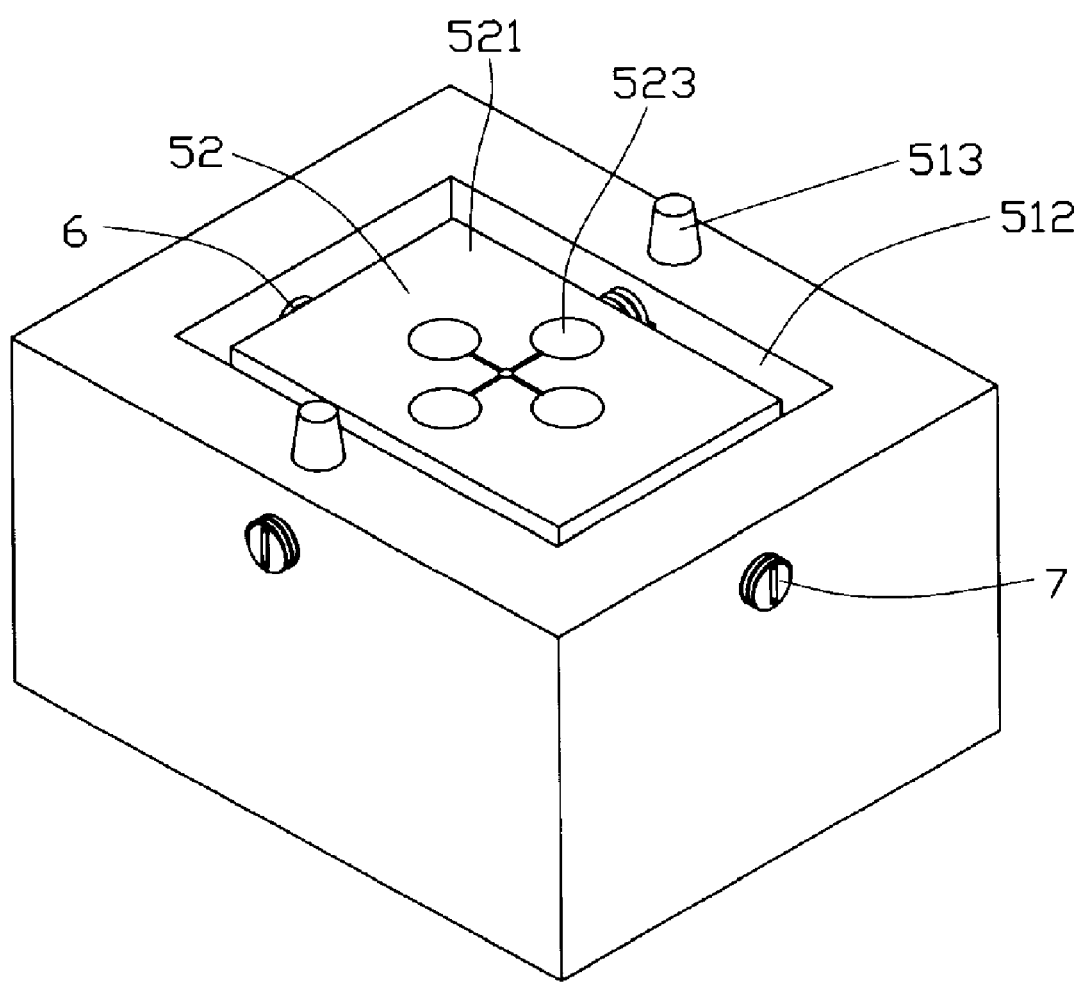
FIG. 5 is an assembled view of the lower mold shown in FIG. 4.

Referring also to FIGS. 4 and 5, the lower mold 5 is generally cube-like, and includes a lower mold carrier 51 and a lower mold core 52. The lower mold carrier 51 has a receiving cavity 512 defined therein, and cooperatively defined by four sidewalls 511. The receiving cavity 512 spatially corresponds to the receiving cavity 412 of the upper mold carrier 41. The receiving cavity 512 is bigger than the lower mold core 52. The lower mold carrier 51 has two locating pins 513 formed thereon in correspondence with the pinholes 413 of the upper mold carrier 41. The two locating pins 513 are both adjacent to the receiving cavity 512. The lower mold carrier 51 also has two screw holes 515 defined therethrough to communicate with the receiving cavity 512. The screw holes 515 each threadly engage with their respective adjusting members 7. A screw hole 515 is defined in both of the two adjacent sidewalls 511. The lower mold carrier 511 has two protruding posts 514 extending inward from another two adjacent sidewalls 511 thereof. The lower mold core 52 is generally cube-like, and includes a surface portion 521. The surface portion 521 has a pouring gate 522 defined therethrough in correspondence with the pouring gate 422 of the upper mold core 42. The surface portion 521 also has four cavities 523 respectively defined along the periphery of the pouring gate 522 in correspondence with the four cavities 423 of the upper mold core 42. Furthermore, the pouring gate 522 and the four mold cavities 523 have four channels 524 defined therebetween. Each of the four mold cavities 423 communicates with the pouring gate 422 via the corresponding one of the four channels 524.

The two elastic members 6 are two cylindrical coil springs. The two elastic members 6 can instead be other elastic ones, such as two disk springs.

The two adjusting members 7 are two cylindrical screws. The two adjusting members 7 can instead be screws with other shape.

In assembly of the upper mold 4, the upper mold core 42 is pressed into the upper mold carrier 41. The upper mold core 42 is tightly secured within the upper mold carrier 41 with the outer end 421 is exposed out of the upper mold carrier 41.

In assembly of the lower mold 5, the two elastic members 6 are both placed around the corresponding protruding posts 514. Pressing the elastic members 6, one end of each elastic member 6 resists one sidewall 511 of the lower mold carrier 51, respectively. The lower mold core 52 is placed into in the receiving cavity 512 of the lower mold 51, with two adjacent sidewalls thereof resisting two other ends of one corresponding elastic members 6, respectively. The receiving cavity 512 of the lower mold carrier 51 receives the lower mold core 52, thus producing a clearance between the lower mold core 53 and the lower mold carrier 51. The two adjusting members 7 are rotated into the corresponding screw holes 515, respectively, with two ends of the adjusting members 7 each resisting one of the other two adjacent sidewalls 511 of the lower mold core 52. The two adjusting members 7 are adjusted to seat the lower mold core 52 in the middle position of the receiving cavity 512.

In assembly of the mold assembly 200, the upper mold 4 and the lower mold 5 are moved toward each other, with the two locating pins 513 of the lower mold carrier 51 engaging in the two locating holes 413 of the upper mold carrier 41, respectively. When the upper mold 4 is completely joined together with the lower mold 5, the upper mold core 42 and the lower mold core 52 abut each other, with the four cavities 423 of the upper mold core 42 aligning with the four cavities 523 of the lower mold core 52, respectively.

In use of the mold assembly 200, the upper mold 4 and the lower mold 5 are joined together to manufacturing lens. There may be misalignment between the upper mold core 42 and the lower mold core 52, thus causing the four cavities 423 of the upper mold core 42 misaligning with the four cavities 523 of the lower mold core 52. In this case, the adjusting members 7 are rotated in the screw hole 515. The adjusting members 7 and the elastic member 6 cooperatively make the lower mold core 52 capable of slight movement relative to the upper mold core 42 to eliminate the misalignment.

A main advantage of the mold assembly 200 is that lenses with high lens concentricity can be achieved by simply adjusting the adjusting member 7, that is, there is no need to modify the mold assembly 200. In addition, it can reduce the production cost greatly.

In further alternative embodiments, with the upper mold carrier 41 being aligned with the lower mold carrier 51, the two locating pins 513 and the two locating pinholes 413 would be omitted. The two elastic members 6 and the two protruding posts 514 can instead be two adjusting members and two screw holes. The two adjusting members each engage in one of the two screw holes.

It is to be understood, however, that even though numerous characteristics and advantages of the present invention have been set forth in the foregoing description, together with details of the structure and function of the invention, the disclosure is illustrative only, and changes may be made in detail, especially mattes of shape, size, and arrangement of parts within the principles of the invention to the full extent indicated by the broad general meaning of the terms in which the appended claims are expressed.

What is claimed is:

1. A mold assembly, comprising:
an upper mold including an upper mold core, the upper mold core defining at least one mold cavity;
a lower mold including a lower mold carrier and a lower mold core, the lower mold carrier defining a receiving cavity therein by a plurality of sidewalls thereof, the sidewalls having a plurality of holes defined therethrough in communication with the receiving cavity, the lower mold core being received in the receiving cavity with a clearance formed therebetween, the lower mold core defining at least one lower mold cavity; and
a plurality of adjusting members each engaging through the lower mold carrier and being received in a corresponding one of the holes to allow manual alignment of the lower mold core with the upper mold core.

2. The mold assembly as claimed in claim 1, further comprising a plurality of elastic members, the elastic members located between the lower mold core and the lower mold carrier, the elastic members corresponding to the adjusting members.

3. The mold assembly as claimed in claim 2, wherein the elastic members are coil springs.

4. The mold assembly as claimed in claim 2, wherein the lower mold carrier has a plurality of protruding posts extending inward from the sidewalls, the protruding posts corresponding to the elastic members.

5. The mold assembly as claimed in claim 4, wherein each elastic member is placed around one respective protruding post.

6. The mold assembly as claimed in claim 1, wherein the holes are screw holes extending through the sidewalls of the lower mold carrier, respectively.

7. The mold assembly as claimed in claim 6, wherein the adjusting members resist the lower mold core.

8. The mold assembly as claimed in claim 7, wherein the adjusting members are screws.

9. The mold assembly as claimed in claim 1, wherein the upper mold further comprises an upper mold carrier, the upper mold carrier including a plurality of sidewalls, the sidewalls cooperatively defining a receiving cavity for receiving the upper mold core.

10. The mold assembly as claimed in claim 1, wherein the lower mold carrier has a plurality of locating pins disposed thereon, the locating pins being around the opening of the lower mold carrier, the upper mold carrier has a plurality of locating pinholes disposed thereof and engaging in the locating pin holes.

11. A mold assembly, comprising:
a first mold including a first mold carrier and a first mold core received in the first mold carrier, the first mold core defining a first molding cavity therein;
a second mold coupled to the first mold in a manner so as to allow their separation, the second mold including a second mold carrier and a second mold core, the second mold carrier in a side opposing the first mold carrier defining a receiving cavity movably receiving the second mold core therein, the second mold carrier defining a second molding cavity opposing the first molding cavity; and
at least one adjusting member engaging through the second mold carrier to allow manual alignment of the second mold cavity with the first mold cavity.

12. The mold assembly as claimed in claim 11, wherein the at least one adjusting member comprises a first adjusting member configured for adjusting the second mold core along a first axis, and a second adjusting member configured for adjusting the second mold core along a second axis perpendicular to the first axis.

13. The mold assembly as claimed in claim 12, further comprising a first spring member biasing the second mold core along the first axis, and a second spring member biasing the second mold core along the second axis.

14. The mold assembly as claimed in claim 13, wherein the lower mold carrier has two protruding posts extending inward from the sidewalls, the protruding posts corresponding to the first and second spring members.

15. The mold assembly as claimed in claim 14, wherein the first and second spring members are placed around one respective protruding post.

16. The mold assembly as claimed in claim 15, wherein the lower mold carrier defines at least one hole, the at least one adjusting member engaging through a corresponding one of the sidewalls and being received in a corresponding one of the holes.

17. The mold assembly as claimed in claim 16, wherein the holes are screw holes extending through the sidewalls of the lower mold carrier, respectively.

* * * * *